(12) United States Patent
Pan et al.

(10) Patent No.: US 11,331,574 B2
(45) Date of Patent: May 17, 2022

(54) METHOD, APPARATUS, ELECTRONIC DEVICE, AND STORAGE MEDIUM FOR LOCKING ON TO TARGET AN OBJECT IN GAME SCENE

(71) Applicant: Tencent Technology (Shenzhen) Company Limited, Guangdong (CN)

(72) Inventors: Jiaqi Pan, Guangdong (CN); Yajun Chen, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 69 days.

(21) Appl. No.: 16/546,037

(22) Filed: Aug. 20, 2019

(65) Prior Publication Data

US 2019/0366214 A1  Dec. 5, 2019

Related U.S. Application Data

(63) Continuation of application No. PCT/CN2018/096070, filed on Jul. 18, 2018.

(30) Foreign Application Priority Data

Jul. 19, 2017  (CN) .......................... 201710591055.8

(51) Int. Cl.
*A63F 13/5372* (2014.01)
*G06T 11/20* (2006.01)

(52) U.S. Cl.
CPC ........ *A63F 13/5372* (2014.09); *G06T 11/203* (2013.01)

(58) Field of Classification Search
CPC .... A63F 13/2145; A63F 13/92; A63F 13/214; A63F 13/42; A63F 13/06; A63F 13/822;

(Continued)

(56) References Cited

U.S. PATENT DOCUMENTS 6,558,258 B1 * 5/2003 Rupert .................. A63F 13/005
463/33
10,095,940 B2  10/2018 Koborita et al.
(Continued)

FOREIGN PATENT DOCUMENTS

CN  104995591 A  10/2015
CN  105194873 A  12/2015
(Continued)

OTHER PUBLICATIONS

Office Action dated Oct. 17, 2018 for corresponding Chinese application No. 2017105910558, in Chinese, 9p.

(Continued)

*Primary Examiner* — James S. McClellan
*Assistant Examiner* — Ross A Williams
(74) *Attorney, Agent, or Firm* — Crowell & Moring LLP

(57) ABSTRACT

This application provides a method and an apparatus for locking on to a target object in a game scene, and an electronic device. The method may include determining at least one to-be-applied object corresponding to a skill currently triggered by the terminal. The method may further include generating, in an active joystick area, a sub-area corresponding to a quantity of the at least one to-be-applied object. The method may further include determining, in at least one sub-area, a target sub-area indicated by a joystick corresponding to the skill. The method may further include determining, as a target object, a to-be-applied object corresponding to the target sub-area.

19 Claims, 7 Drawing Sheets

(58) Field of Classification Search
CPC ........ A63F 2009/241; A63F 2300/1075; A63F 2300/5255; A63F 2300/807; A63F 13/5372; G06F 3/0488; G06F 3/0338; G06F 3/04815; G06F 3/04847; G06F 3/0482

See application file for complete search history.

(56) References Cited

U.S. PATENT DOCUMENTS

| | | | |
|---|---|---|---|
| 10,456,667 B2* | 10/2019 | Tang | A63F 13/2145 |
| 2011/0130182 A1* | 6/2011 | Namba | A63F 13/42 463/3 |
| 2011/0285636 A1* | 11/2011 | Howard | A63F 13/2145 345/173 |
| 2013/0288790 A1 | 10/2013 | Wang | |
| 2014/0149903 A1 | 5/2014 | Ahn et al. | |
| 2016/0043870 A1 | 2/2016 | Avanzi | |
| 2018/0024660 A1 | 1/2018 | Wang | |

FOREIGN PATENT DOCUMENTS

| | | |
|---|---|---|
| CN | 105320410 A | 2/2016 |
| CN | 105373336 A | 3/2016 |
| CN | 106933346 A | 7/2017 |
| CN | 107067250 A | 8/2017 |
| CN | 107133794 A | 9/2017 |
| CN | 107362535 A | 11/2017 |
| JP | 07-178246 | 7/1995 |
| JP | 09-016370 | 1/1997 |
| JP | 2003-044219 | 2/2003 |
| JP | 2004-318433 | 11/2004 |
| WO | WO 2019/015596 A1 | 1/2019 |

OTHER PUBLICATIONS

Office Action dated Jan. 8, 2019 for corresponding Chinese application No. 2017105910558, in Chinese, 3p.
International Search Report dated Oct. 18, 2018 for PCT/CN2018/096070, in Chinese, 10p.
Office action of Japanese application 2020-522779 dated Feb. 8, 2021, with translation summary, 5 pages.
Office action of Chinese application 201810936092.2 dated Mar. 25, 2021, 16 pages, with machine translation.
Marcel Heckel et al., "X-O Arch Menu: Combining Precise Positioning with Efficient Menu Selection on Touch Devices," *ITS 2014*, Nov. 16-19, 2014, pp. 317-322, Dresden, Germany.
First Office Action for corresponding application No. EP 18 835 082.1, dated Dec. 8, 2021, 7p.
Office Action for Thai application No. 1901007105 dated Aug. 29, 2021, 2p, in Thai language.
Concise Explanation of Relevance for C1.

* cited by examiner

METHOD, APPARATUS, ELECTRONIC DEVICE, AND STORAGE MEDIUM FOR LOCKING ON TO TARGET AN OBJECT IN GAME SCENE

RELATED APPLICATION

This application is a continuation of and claims priority to Patent Cooperation Treaty International Application No. PCT/CN2018/096070, which claims priority to Chinese Patent Application No. 201710591055.8, filed Jul. 19, 2017, and entitled "METHOD AND APPARATUS FOR LOCKING TARGET OBJECT IN GAME SCENE, AND ELECTRONIC DEVICE", each of which being incorporated herein by reference in its entirety.

FIELD OF THE TECHNOLOGY

This application relates to the field of data processing technologies, and more specifically, to a method and an apparatus for locking on to a target object in a game scene, an electronic device, and a storage medium.

BACKGROUND OF THE DISCLOSURE

Currently, an application (APP) can implement a function that a user applies a skill to one or more objects (persons or things). For example, in a multiplayer online battle arena (MOBA) game, a skill that may be applied to an enemy includes spell casting, or the like. In a sports action game, a skill that may be applied includes ball passing, or the like. In a process of applying a skill to an object, precisely locking the object may increase user experience in connection with the APP or MOBA game.

SUMMARY

An embodiment provides a method for locking on to a target object (in other words, a creating "locked target object" or "locking a target") or otherwise obtaining a target lock in a game scene. The method includes determining at least one to-be-applied object corresponding to a skill currently triggered by a terminal. The method includes generating, in an active joystick area, a sub-area corresponding to a quantity of the at least one to-be-applied object, one sub-area corresponding to one to-be-applied object. The method includes determining, in at least one sub-area, a target sub-area indicated by a joystick corresponding to the skill. The method includes determining, as a target object, a to-be-applied object corresponding to the target sub-area.

An embodiment provides an apparatus for locking a target object in a game scene. The apparatus includes a first determining module, configured to determine at least one to-be-applied object corresponding to a skill currently triggered by a terminal. The apparatus includes a generation module, configured to generate, in an active joystick area, a sub-area corresponding to a quantity of the at least one to-be-applied object, one sub-area corresponding to one to-be-applied object. The apparatus includes a second determining module, configured to determine, in at least one sub-area, a target sub-area indicated by a joystick corresponding to the skill. The apparatus includes a third determining module, configured to determine, as a target object, a to-be-applied object corresponding to the target sub-area.

An embodiment provides an electronic device, including a memory, configured to store a program; and a processor, configured to execute the program, the program being specifically configured to perform the foregoing method.

An embodiment provides a non-transitory computer readable storage medium, storing computer readable instructions, that when executed cause at least one processor to perform the foregoing method.

BRIEF DESCRIPTION OF THE DRAWINGS

To describe the technical solutions in the embodiments of this application or in the existing technology more clearly, the following briefly introduces the accompanying drawings for describing the embodiments or the existing technology. Apparently, the accompanying drawings in the following description show example embodiments of this application to illustrate the principles of the techniques and architectures discussed herein.

DESCRIPTION OF EMBODIMENTS

The technical solutions in the embodiments of this application is described in the following with reference to the accompanying drawings in the embodiments of this application. The embodiments to be described are some rather than all of the embodiments of this application.

A method for locking a target object in a game scene according to various embodiments may be applied to a plurality of types of APPs, for example, game APPs for an MOBA game (such as the Super NBA game) and a sports action game. An electronic device or a terminal on which the foregoing types of APPs are installed may have a function shown in the method for locking the target object in the game scene. The electronic device or the terminal may be a notebook computer, a mobile phone, a PAD (a tablet computer), an in-vehicle terminal, an intelligent wearable device, or the like.

Figure 1:
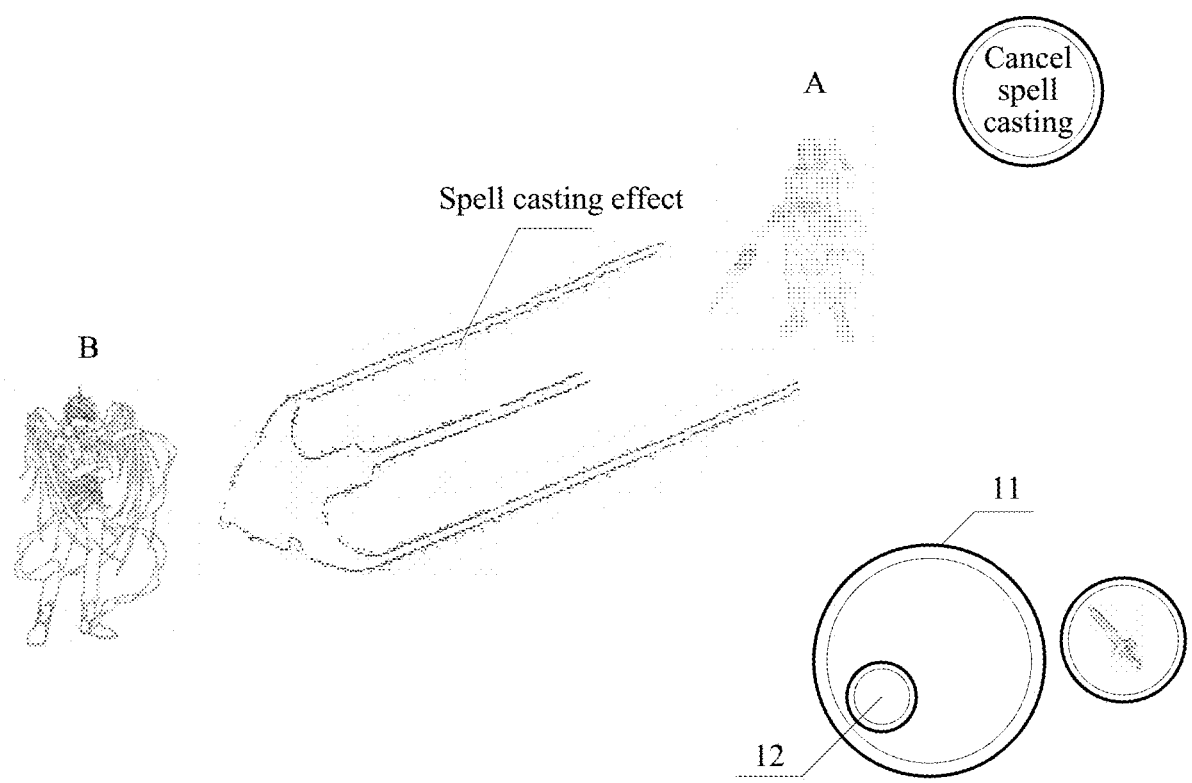
FIG. 1 is a schematic diagram of applying a skill in an MOBA game.

In some embodiments, a user may guide the motion, orientation, position, and/or bearing of an object by using a joystick displayed on an APP. The joystick is an operation controller displayed on the APP. For example, the joystick is dragged to a location that indicates the direction of the object and that is in an active joystick area. The following provides descriptions by using a specific example. FIG. 1 is a schematic diagram of applying a skill in an MOBA game. It is assumed that a user object A indicates a user. If the user object A needs to apply a skill to an object B, the user object A may position, in an active joystick area 11, a joystick 12 to a location (e.g., an orientation or other input state) indicating a direction of the object B. The location may be specifically a location of the joystick 12 in FIG. 1. After releasing the joystick 12, the user may apply the skill in the indicated direction. A skill application effect is shown in FIG. 1. In the foregoing process of precisely locking on to an object, the user needs to repeatedly adjust the location of the joystick, increasing a time spent by the user on locking on to the object.

Figure 2:
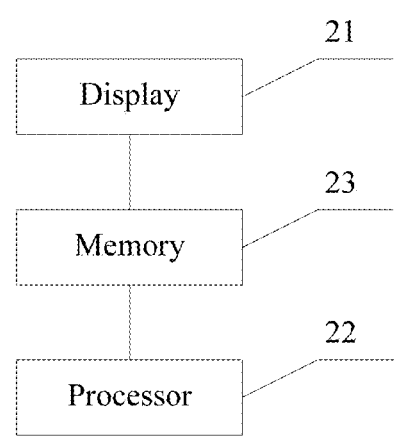
FIG. 2 is a structural diagram of an electronic device.

FIG. 2 is a structural diagram of an electronic device according to an embodiment of this application. The electronic device may include: a display 21, a memory 22, and a processor 23. The display 21 may be configured to display an interface of an APP, where a joystick and an active joystick area may be displayed on the interface. For example, the display 21 may display an interface shown in FIG. 1, or may display an interface of a sports action game such as the example shown in FIG. 3. The memory 22 is configured to store data and a program that correspond to the APP installed on the electronic device. The processor 23 is configured to execute the program. The program is configured to determine at least one to-be-applied object (namely, at least one to-be-applied object corresponding to a skill triggered by a user by using the terminal) corresponding to a skill currently triggered by the terminal. The program is further configured to generate, in an active joystick area, a sub-area corresponding to a quantity of the at least one to-be-applied object. The program is further configured to determine, in at least one sub-area, a target sub-area indicated by a joystick corresponding to the skill. The program is further configured to determine, as a target object, a to-be-applied object corresponding to the target sub-area, where one to-be-applied object corresponds to one sub-area. In some embodiments, a quantity of to-be-applied objects is equal to a quantity of sub-areas.

Figure 3:
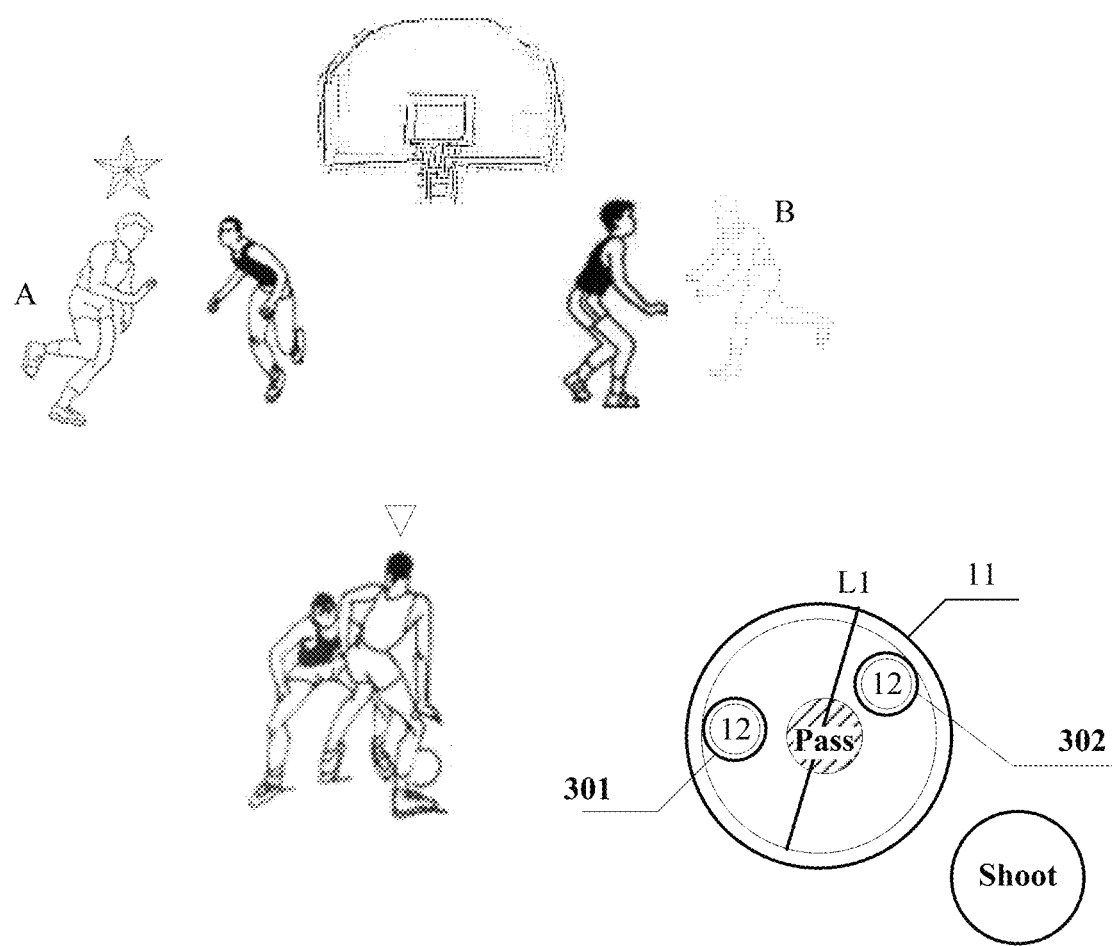
FIG. 3 is a schematic interface diagram of a sports action game.

A terminal object marked by using a triangle in FIG. 3 is an object that is selected on the terminal by the user and that represents the user. The terminal object may pass a basketball to teammates of the terminal object, namely, a to-be-applied object A and a to-be-applied object B. Because there are two to-be-applied objects, the active joystick area may be divided into at least two sub-areas. For example, an area boundary line L1 in FIG. 3 divides the active joystick area 11 into two sub-areas.

In some embodiments, the terminal object can accurately pass the basketball to the to-be-applied object A when the joystick 12 is located at a location 1 shown in 301 in FIG. 3. The terminal object can accurately pass the basketball to the to-be-applied object B when the joystick 12 is located at a location 2 shown in 302 in FIG. 3.

In some embodiments, when the joystick 12 is at any location in a sub-area to the left of an area boundary line L1, the processor 23 may determine that the user may pass the ball to the to-be-applied object A. When the joystick 12 is at any location in a sub-area to the right of an area boundary line L1, the processor 23 may determine that the user may pass the ball to the to-be-applied object B. Each sub-area includes a plurality of locations indicating different directions, and the locations that indicate the different directions and that are included in each sub-area all correspond to corresponding to-be-applied objects. Therefore, in a process of locking on to the target object, the user may drag the joystick to any location in the target sub-area, without needing to accurately position the joystick to a location indicating a direction of the target object. Therefore, a fault tolerance range is may be large relative to the positioning range that would be acceptable without the fault tolerance. In addition, the technical solution can enable the user to quickly and precisely lock on to one of a plurality of to-be-applied objects, reducing a time spent by the user on locking on to the object. A phenomenon that a skill is not applied to a to-be-applied object and that is caused by a slight deviation between a direction in which the user drags the joystick in the active joystick area and a direction of the to-be-applied object and a slight movement of the to-be-applied object is avoided.

Figure 4:
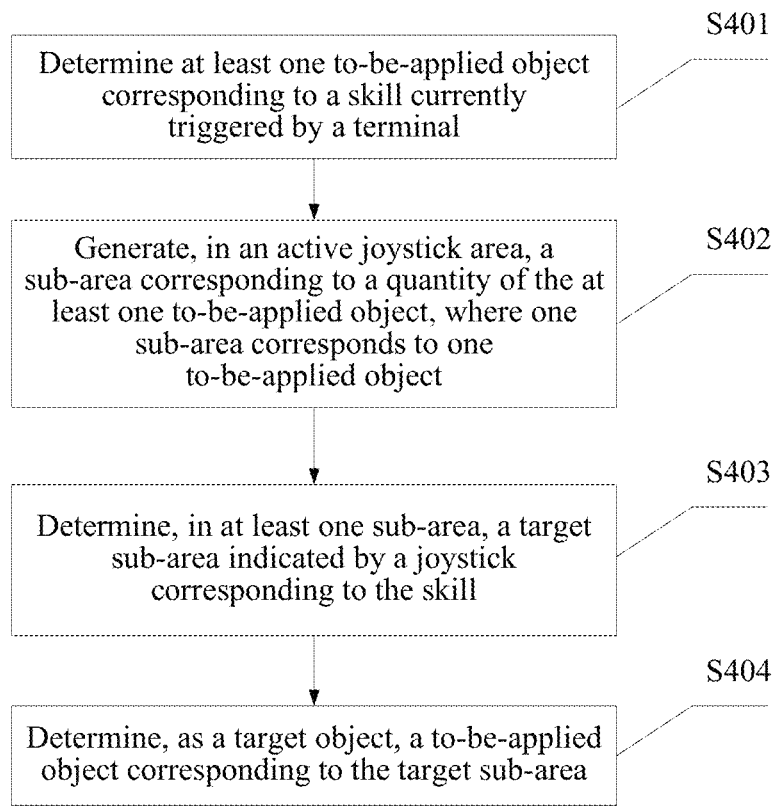
FIG. 4 is a flowchart of a method for locking a target object in a game scene.

With reference to the foregoing structure, the following describes in detail the method for locking the target object in the game scene according to various embodiments. FIG. 4 is a flowchart of a method for locking a target object in a game scene according to various embodiments. The method includes one or more steps. The method includes determining at least one to-be-applied object corresponding to a skill currently triggered by a terminal (S401).

For example, determining at least one to-be-applied object corresponding to a skill currently triggered by a terminal may include obtaining a category of the currently triggered skill; and determine, as a to-be-applied object, an object to which a skill of the category can be applied.

In some cases, different skills have different to-be-applied objects. For example, if a skill is "ball passing", a to-be-applied object is a member of one's own team, but not necessarily a teammate member of an opposite team. For example, if a skill is "spell casting attack", a to-be-applied object is an "enemy", but not necessarily one's own teammate.

For example, determining at least one to-be-applied object corresponding to a skill currently triggered by a terminal may include, obtaining an application range corresponding to the skill, and determining the at least one to-be-applied object according to the application range.

In some cases, determining the at least one to-be-applied object according to the application range may be implemented by determining as the to-be-applied object, an object located in the application range corresponding to the skill.

In some cases, different skills may have different application ranges. For example, application ranges of some skills are an entire map, and application ranges of some skills are a circle whose center is a location at which a terminal object is located and whose radius is a preset distance. Application ranges of some skills are a range currently displayed on a display. For example, in a basketball game, when a user is preparing to pass a ball, an application range of the skill may be a range currently displayed on a display.

In some cases, determining the at least one to-be-applied object according to the application range may be implemented by determining, as the to-be-applied object, an object that is located in the application range corresponding to the skill and to which the skill can be applied.

In the embodiment shown in FIG. 3, because the currently triggered skill is "ball passing", the object A and the object B are teammates of the user, and the object A and the object B are both in a range currently displayed on a display, the object A and the object B are to-be-applied objects. In some embodiments, FIG. 3 may be a game scene in the Super NBA game.

In some cases, when, the application range corresponding to the skill includes the terminal object and at least two objects determining the at least one to-be-applied object according to the application range may be implemented by separately connecting a location of the terminal object and locations of the objects located in the application range, to form a connection straight line, and determining, as the to-be-applied object, an object that is on the connection straight line and that is closest to the location of the terminal object.

In an example process of applying a skill to the target object, to enable the user to have a better experience effect, for a direction in which the skill is applied, a map location at which the terminal object is located may be a start point, and a direction of a connection line between the location of the terminal object and a location of the target object may be the direction in which the skill is applied. During application, a plurality of objects and the terminal object may be located on the same straight line. Because directions in which the terminal object applies the skill to the plurality of objects are the same, an object to which the skill is applied cannot be determined. Therefore, an object that is on the connection straight line and that is closest to the terminal object is determined as the to-be-applied object. This includes two cases:

In some cases, if the connection straight line includes a location of only one object, the object is determined as the to-be-applied object. In other words, when the connection straight line includes a location of only one object, the object is the object closet to the location of the terminal object.

In some cases, if the connection straight line includes locations corresponding to at least two objects, an object in the at least two objects that is closest to the location of the terminal object is determined as the to-be-applied object.

In some cases, the locations may be locations of the terminal object and the objects on a map, or may be locations that are in a drawing area in the background and to which locations of the terminal object and the objects are mapped.

Step S402: Generate, in an active joystick area, a sub-area corresponding to a quantity of the at least one to-be-applied object, where one sub-area corresponds to one to-be-applied object.

There are a plurality of methods for "generating, in an active joystick area, a sub-area corresponding to a quantity of the at least one to-be-applied object". This embodiment of this application provides but is not limited to the following methods:

First method: When the quantity of to-be-applied objects is one, the active joystick area is a sub-area corresponding to the to-be-applied object.

Second method: When the quantity of to-be-applied objects is M, and M is greater than or equal to 2, the active joystick area may be evenly divided into M sub-areas.

Third method: When the quantity of to-be-applied objects is M, and M is greater than or equal to 2, the sub-area corresponding to the quantity of the at least one to-be-applied object may be generated in the active joystick area based on a relative location relationship between the terminal object and the to-be-applied objects.

For example, in FIG. 3, because the object A is to the left of the terminal object and the object B is to the right of the terminal object, a sub-area to the left of the area boundary line L1 corresponds to the object A, and a sub-area to the right of the area boundary line L1 corresponds to the object B.

The method, discussed above as including one or more steps may further include determining, in at least one sub-area, a target sub-area indicated by a joystick corresponding to the skill (S403).

In this embodiment and other embodiments, the target sub-area indicated by the joystick corresponding to the skill may include various cases.

In an example case, the joystick can move in the active joystick area, and/or on an area edge of the active joystick area, and then the target sub-area indicated by the joystick is a target sub-area in which the joystick is located.

Figure 5:
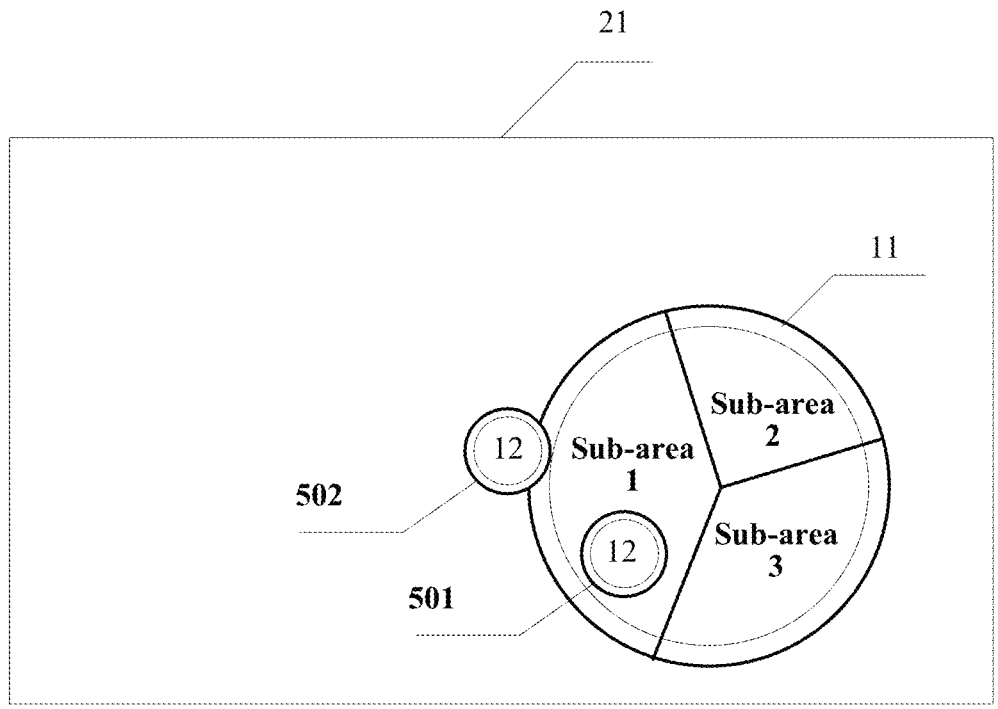
FIG. 5 is a schematic diagram of sub-areas in an active joystick area.

FIG. 5 is a schematic diagram of sub-areas in an example active joystick area. In this and other embodiments, descriptions are provided by using an example in which the active joystick area includes three sub-areas. The three sub-areas are respectively: a sub-area 1, a sub-area 2, and a sub-area 3.

The joystick 12 may move in the active joystick area, for example, a location 3 shown in 501 in FIG. 5; and/or the joystick 12 may move on the area edge of the active joystick area, for example, a location 4 shown in 502 in FIG. 5. No matter whether the joystick is at the location 3 or at the location 4, the processor determines that the joystick 12 is in the sub-area 1.

In another example case, the joystick may move on an entire interface currently displayed on a display 21, and the target sub-area indicated by the joystick may be a target sub-area in which the joystick is located, or may be a sector radiation area of a target sub-area in which the joystick is located.

Figure 6:
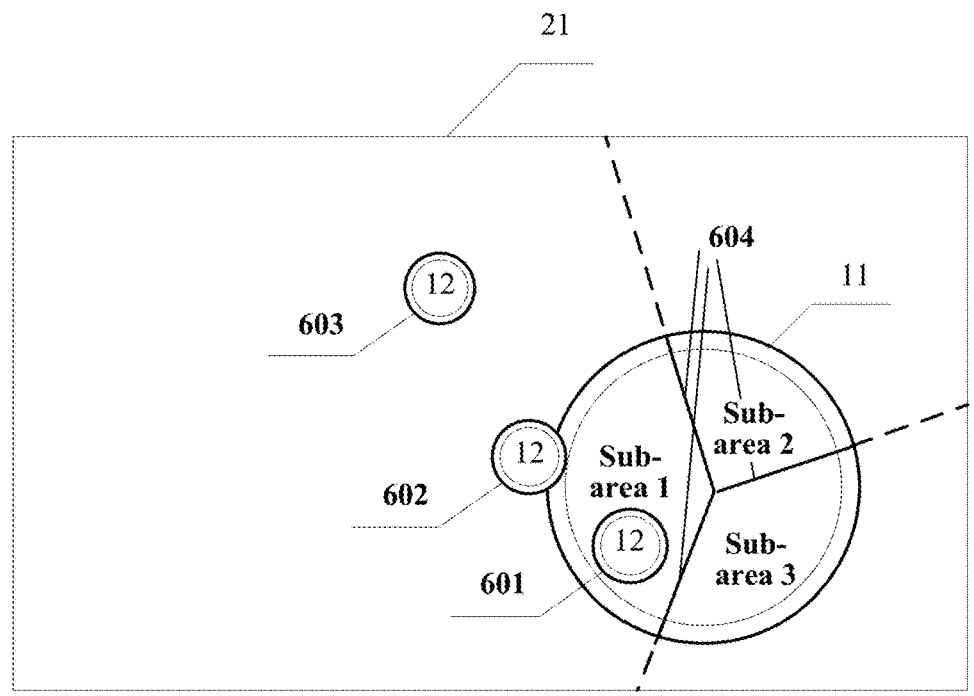
FIG. 6 is another schematic diagram of sub-areas in an active joystick area.

FIG. 6 is another schematic diagram of sub-areas in an example active joystick area. In this and other embodiments, descriptions are provided by using an example in which the active joystick area includes three sub-areas. The three sub-areas are respectively: a sub-area 1, a sub-area 2, and a sub-area 3.

The joystick 12 may move in the active joystick area, for example, a location 3 shown in 601 in FIG. 6; and/or the joystick may move on an area edge of the active joystick area, for example, a location 4 shown in 602 in FIG. 6; and/or the joystick may move on an external side of an area edge of the active joystick area, for example, a location 5 shown in 603 in FIG. 6. In conclusion, the joystick may move at any location on an interface displayed on the display 21.

Dashed extension lines of area boundary lines (solid lines shown in 604) in FIG. 6 are sector radiation areas of the sub-areas. If the joystick 12 is located in a sector radiation area of a sub-area, the processor determines that the joystick 12 indicates the sub-area. For example, if the joystick 12 is at the location 5 shown in 603 in FIG. 6, the processor determines that the target sub-area indicated by the joystick is the sub-area 1.

The method, discussed above as including one or more steps may further include determining, as a target object, a to-be-applied object corresponding to the target sub-area.

Because one sub-area corresponds to one to-be-applied object, after the target sub-area indicated by the joystick is determined, the to-be-applied object corresponding to the target sub-area may be determined as the target object.

Using FIG. 3 as an example, the area boundary line L1 and the area edge of the active joystick area form an area boundary that divides sub-areas. The area boundary divides the active joystick area into two sub-areas.

If the joystick 12 is located at any location in the sub-area to the left of the area boundary line L1, such as the location 1 shown in 301 in FIG. 3, the sub-area to the left of the area boundary line L1 is determined as the target sub-area, and the object A corresponding to the sub-area is the target object. If the joystick 12 is located at any location in the sub-area to the right of the area boundary line L2, such as the location 2 shown in 302 in FIG. 3, the sub-area to the right of the area boundary line L1 is determined as the target sub-area, and the object B corresponding to the sub-area is the target object.

When the user determines to apply a skill (for example, release the joystick), the corresponding skill is applied to the target object.

According to one or more method for locking on the target object in the game scene provided in this embodiment of this application, the at least one to-be-applied object corresponding to the skill currently triggered by the terminal is first determined. Then, the sub-area corresponding to the quantity of the at least one to-be-applied object is generated in the active joystick area; the target sub-area indicated by the joystick corresponding to the skill is determined in the at least one sub-area, and the to-be-applied object corresponding to the target sub-area is determined as the target object. Each sub-area may include a plurality of locations indicating different directions, and that locations that indicate the different directions and that are included in each sub-area all correspond to corresponding to-be-applied object. Therefore, in a process of locking the target object by using the terminal, the user may drag the joystick to any location in the target sub-area, without needing to accurately drag the joystick to a location indicating a direction of the target object. Therefore, a fault tolerance range may be large relative to the positioning range that would be acceptable without the fault tolerance. In addition, the user can be enabled to quickly and precisely lock one of a plurality of to-be-applied objects, reducing a time spent by the user on locking the object. A phenomenon that a skill is not applied to a to-be-applied object and that is caused by a slight deviation between a direction in which the user drags the joystick in the active joystick area and a direction of the to-be-applied object and a slight movement of the to-be-applied object is avoided.

In a process of generating a sub-area in the active joystick area, to more comply with a behavior habit of the user, for example, if the target object is located to the upper left of the terminal object, the user usually drags the joystick to an upper left side of the active joystick area. Therefore, in some embodiments, a specific implementation of step S402 may be the following example. In the example, step S402 may include determining a relative location relationship between the at least one to-be-applied object and a terminal object that represents the terminal, and generating, in the active joystick area according to the relative location relationship, the sub-area corresponding to the quantity of the at least one to-be-applied object.

In some cases, generating a sub-area in the active joystick area may include obtaining an area boundary for distinguishing each sub-area. In some cases, in a process of obtaining the area boundary of each sub-area, the electronic device may perform the obtaining in the background. Therefore, locations of the terminal object and the at least one to-be-applied object on the map be mapped to corresponding locations in the drawing area in the background. In some cases, the generating, in the active joystick area according to the relative location relationship, the sub-area corresponding to the quantity of the at least one to-be-applied object includes mapping locations of the terminal object and the at least one to-be-applied object on a map to corresponding locations in a drawing area; and generating, in the active joystick area according to the corresponding locations of the terminal object and the at least one to-be-applied object in the drawing area, the sub-area corresponding to the quantity of the at least one to-be-applied object.

The locations provided in this and other embodiments of this application may refer to corresponding location coordinates.

A coordinate system corresponding to the terminal object and the at least one to-be-applied object displayed on the display may be a two-dimensional coordinate system, a three-dimensional coordinate system, or the like, and a coordinate system corresponding to the active joystick area is usually a two-dimensional coordinate system. Therefore, when the locations of the terminal object and the at least one to-be-applied object are mapped to the drawing area in the background, coordinate system conversion may be further required. There are a plurality of coordinate system conversion manners. In an example, if a coordinate system corresponding to coordinates of the terminal object and the at least one to-be-applied object is a three-dimensional coordinate system, in a process of mapping the locations to the corresponding locations in the drawing area in the background, a coordinate that is used for representing a height from the ground and that is in the coordinates of the terminal object and the at least one to-be-applied object may be deleted. This may be used to obtain two-dimensional coordinates of the terminal object and the at least one to-be-applied object. If a coordinate system of the location coordinates of the terminal object and the at least one to-be-applied object is the same as a coordinate system of the active joystick area, no coordinate conversion may necessarily be performed.

In a process of mapping locations of the terminal object and the at least one to-be-applied object on a map to corresponding locations in a drawing area, the location of the terminal object on the map may be first mapped to a first preset location in the drawing area, and then the at least one to-be-applied object is mapped to the corresponding location in the drawing area based on the relative location relationship between the terminal object and the at least one to-be-applied object on the map; or a location of the first to-be-applied object in the at least one to-be-applied object on the map is first mapped to the drawing area. Then, locations of the terminal object and the other to-be-applied object on the map are mapped to the drawing area based on locations of the terminal object and the other to-be-applied object relative to the first to-be-applied object on the map.

In the process of mapping locations of the terminal object and the at least one to-be-applied object on a map to corresponding locations in a drawing area, mapping with a proportion of 1:1 may be directly performed in the drawing area according to the location coordinate of the terminal object and the location coordinate of the at least one to-be-applied object. For example, if a lateral distance is five meters and a longitudinal distance is six meters between the terminal object and the first to-be-applied object, a lateral distance is five meters and a longitudinal distance is six meters between the terminal object and the first to-be-applied object in the drawing area. Mapping with a preset proportion may be performed. For example, if a lateral distance is five meters and a longitudinal distance is six meters between the terminal object and the first to-be-applied object, a lateral distance is five centimeters and a longitudinal distance is six centimeters between the terminal object and the first to-be-applied object in the drawing area.

A specific value of the preset proportion may be determined according to the details of various cases.

To ensure that the relative location relationship between the terminal object and the at least one to-be-applied object is not changed, in a process of mapping, a preset proportion of a relative distance between the terminal object and the at least one to-be-applied object is the same.

Because coordinate systems of the location of the active joystick area, the location of the terminal object, and the coordinate of the at least one to-be-applied object that are mapped in the drawing area are the same coordinate system, the area boundary of each sub-area may be directly determined in the drawing area. The generating, in the active joystick area according to the corresponding locations of the terminal object and the at least one to-be-applied object in the drawing area, the sub-area corresponding to the quantity of the at least one to-be-applied object may include determining, based on relative locations of the terminal object and each to-be-applied object in the drawing area, an area boundary used for distinguishing each sub-area; and generating, in the active joystick area based on each area boundary, the sub-area corresponding to the quantity of to-be-applied objects.

In some cases, determining, based on relative locations of the terminal object and each to-be-applied object in the drawing area, an area boundary is used for distinguishing each sub-area. In this and other embodiments, the quantity of to-be-applied objects is one. The sub-area is the active joystick area, and the area boundary used for distinguishing the sub-area is the area edge of the active joystick area.

In various embodiments, the quantity of each to-be-applied object is two. The locations of the two to-be-applied objects in the drawing area are connected. In some cases, location coordinates of the two to-be-applied objects in the drawing area may be connected. After locations of the two to-be-applied objects in the drawing area are connected, a connection line segment may be obtained.

Because there are only two to-be-applied objects, it may be considered that only one connection line segment is obtained. Alternatively, it may be considered that two overlapped connection line segments are obtained. In this case, a start location of one connection line segment is an end location of the other connection line segment, and an end location of the one connection line segment is a start location of the other connection line segment. In this embodiment of this application, overlapped connection line segments are allowed to serve as two connection line segments only when the quantity of to-be-applied object is two, and overlapped connection line segments are one connection line segment when the quantity of to-be-applied objects is three.

A target point that is not an endpoint is determined in the obtained connection line segment. In some embodiments, the target point is a middle point of the connection line segment.

The first preset location is connected to the target point, to form a quasi-boundary straight line corresponding to a quantity of connection line segments, where the first preset location is a location of the terminal object in the drawing area.

An area boundary line corresponding to each quasi-boundary straight line is formed by using a second preset location in the active joystick area mapped in the drawing area, to form an area boundary.

Figure 7:
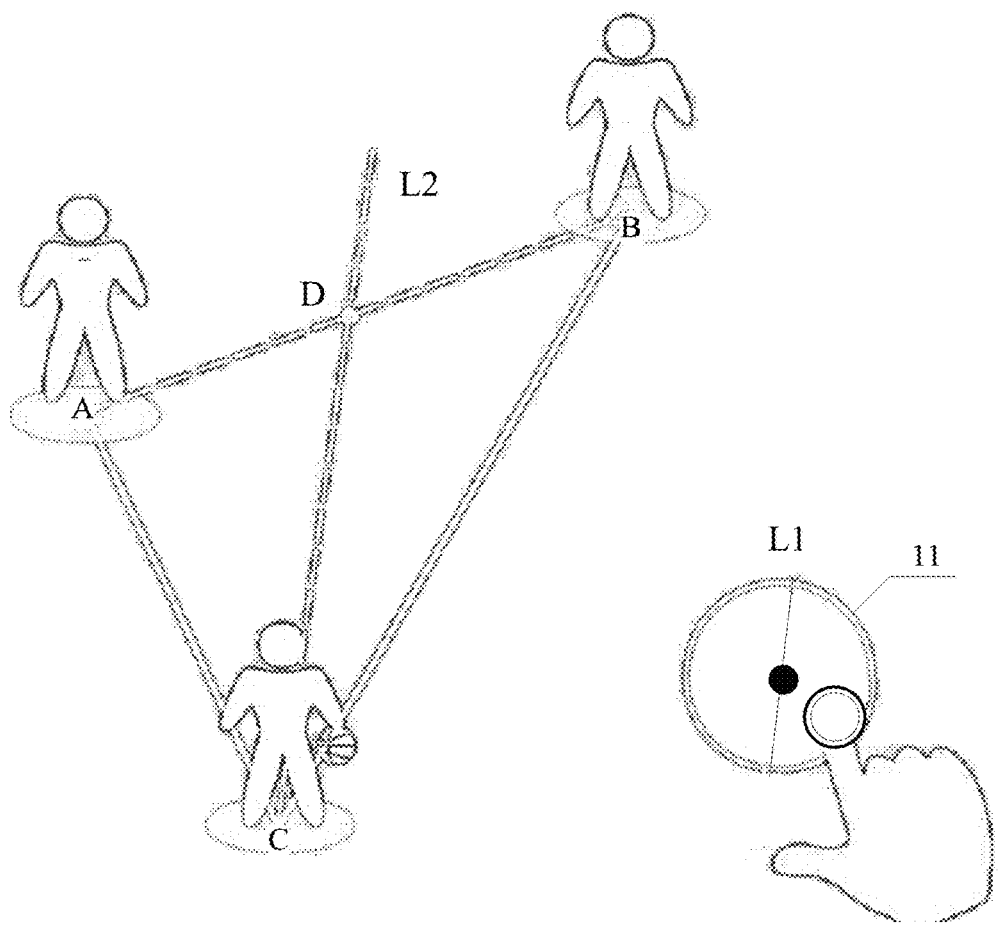
FIG. 7 is a schematic diagram of mapping a terminal object and two to-be-applied objects to a drawing area in FIG. 3.

FIG. 7 is a schematic diagram of an example mapping of a terminal object and two to-be-applied objects to an example drawing area in FIG. 3. In some embodiments, FIG. 7 may be a game scene in the Super NBA game.

Assuming that a location of the terminal object in the drawing area is a first preset location C, a location of the object A in the drawing area is a location A, and a location of the object B in the drawing area is a location B, by connecting the location A and the location B, a connection line segment AB may be obtained, or a connection line segment AB and a connection line segment BA may be obtained.

The terminal object at the preset location C may pass a basketball to the object A, or may pass a basketball to the object B.

When the connection line segment AB is obtained and a target point of the determined connection line segment AB is a point D, the first preset location C and the point D are connected to obtain a quasi-boundary straight line L2.

The area boundary line corresponding to each quasi-boundary straight line is formed by using the second preset location in the active joystick area mapped in the drawing area, for example, the location shown by the black point in FIG. 7. In some embodiments, the second preset location may be a circle center of the active joystick area. For example, a parallel line L1 of L2 is drawn by using the second preset location. L1 is an area boundary line, and two ends of the area boundary line L1 are located on the area edge of the active joystick area.

The area boundary line L1 and the area edge of the active joystick area form the area boundary, and each area boundary divides the active joystick area into two sub-areas.

Figure 8:
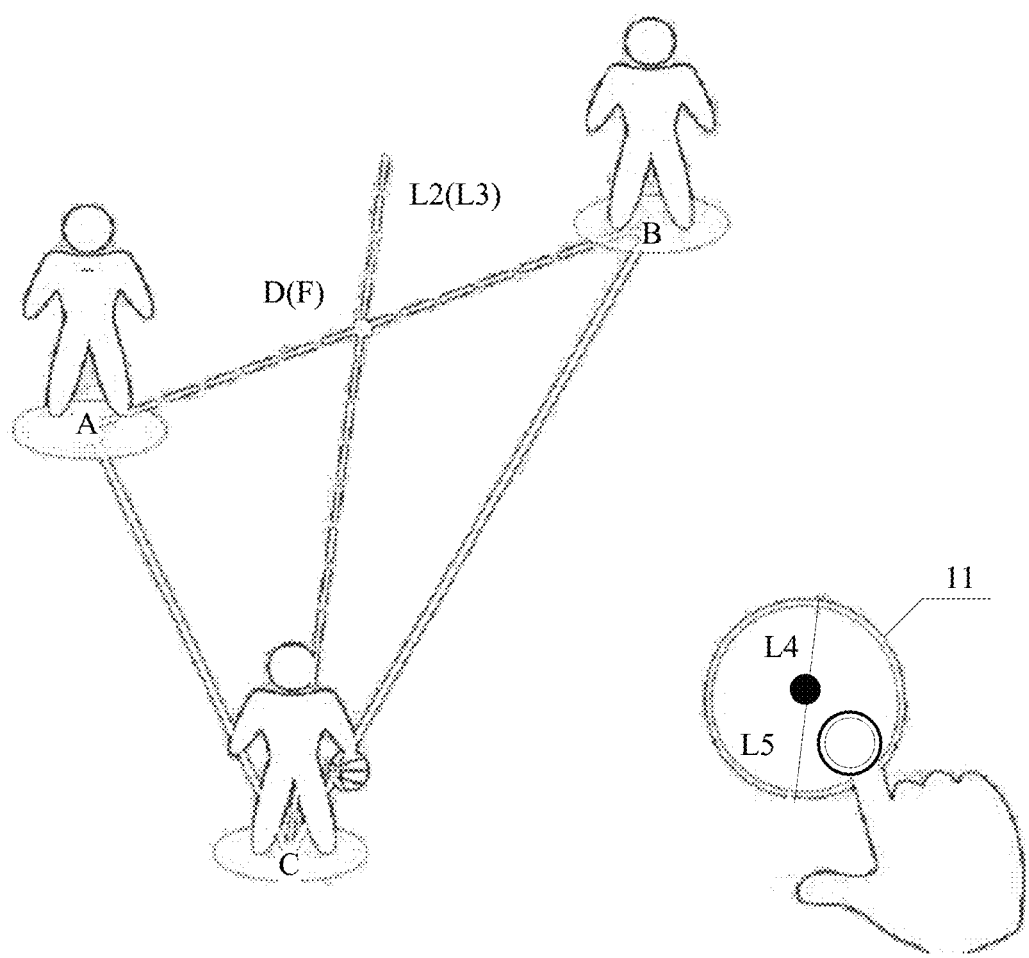
FIG. 8 is another schematic diagram of mapping a terminal object and two to-be-applied objects to a drawing area in FIG. 3.

When the connection line segment AB and the connection line segment BA are obtained (refer to FIG. 8) the target point of the determined connection line segment AB is the point D, and a target point of the determined connection line segment BA is a point F that overlaps the point D (or that may not coincide with the point D, where this is only an example for description herein), the first preset location C and the point D are connected, and the first preset location C and the point F are connected, to obtain a quasi-boundary straight line L2 and a quasi-boundary straight line L3. An area boundary line L4 corresponding to the quasi-boundary straight line L2 and an area boundary line L5 corresponding to the quasi-boundary straight line L3 are obtained by using the second preset location. One end of the area boundary line L4 is the second preset location, and the other end is located on the area edge of the active joystick area. One end of the area boundary line L5 is the second preset location, and the other end is located the edge of the active joystick area.

The area boundary line L4, the area boundary line L5, and the area edge of the active joystick area form the area boundary, and each area boundary divides the active joystick area into two sub-areas.

In some cases, the quantity of each to-be-applied object is greater than or equal to 3. For some cases, where the quantity is greater than 2, the method may include successively connecting the location of each to-be-applied object in the drawing area, to obtain a plurality of connection line segments, where one location is an endpoint of two connection line segments. The method may further include respectively determining, in each connection line segment, a target point that is not the endpoint. The method may further include separately connecting a first preset location and each target point, to form a quasi-boundary straight line corresponding to a quantity of connection line segments, where the first preset location is a location of the terminal object in the drawing area. The method may further include forming, by using a second preset location in the active joystick area mapped in the drawing area, an area boundary line corresponding to each quasi-boundary straight line, to form an area boundary.

Figure 9:
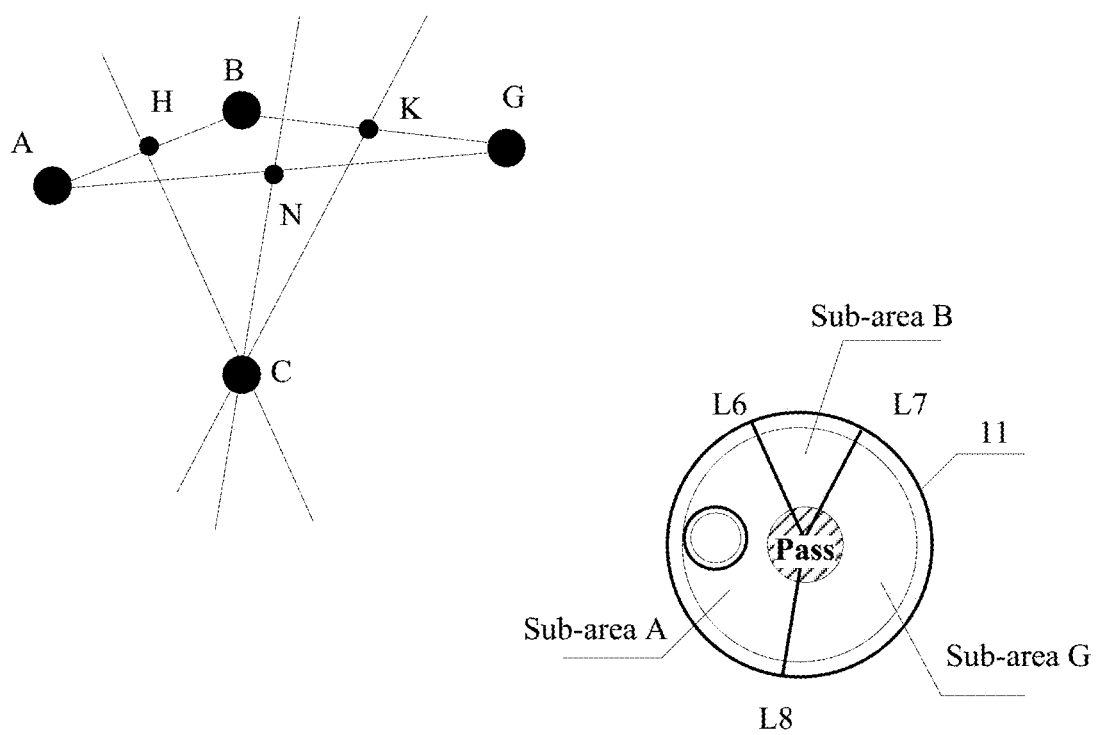
FIG. 9 is still another schematic diagram of mapping a terminal object and to-be-applied objects to a drawing area.

FIG. 9 is yet another schematic diagram of an example mapping of a terminal object and to-be-applied objects to a drawing area. In this and other embodiments, descriptions are provided by using an example in which a quantity of to-be-applied objects is three. In some cases, locations of the to-be-applied objects in the drawing area are respectively a location A, a location B, and a location G, and a location of the terminal object in the drawing area is a first preset location C.

The locations of the to-be-applied objects in the drawing area are successively connected, to obtain a plurality of connection line segments. In some embodiments, the locations of the to-be-applied objects in the drawing area may be successively connected along a clockwise direction or an anticlockwise direction. As shown in FIG. 9, AB, BG, and GA may be successively connected, to obtain three connection line segments AB, BG, and GA; GB, BA, and AG may be successively connected, to obtain three connection line segments GB, BA, and AG; AG, GB, and BA may be successively connected; or the like.

Various techniques may be used to connect the locations of the to-be-applied objects in the drawing area, provided that the method enables each location to be endpoints of two line segments. In addition, the locations of the to-be-applied objects in the drawing area are successively connected, to form a closed graph. This case is also applicable to a case in which the quantity of to-be-applied objects is two. An example technique is shown in FIG. 7.

When the three obtained connection line segments are a connection line segment AB, a connection line segment BG, and a connection line segment GA, and when a target point determined in the connection line segment AB is H, a target point determined in the connection line segment BG is K, and a target point determined in the connection line segment GA is N. The first preset location C is connected to the target point H, to obtain a quasi-boundary straight line CH. The first preset location C is connected to the target point K to obtain a quasi-boundary straight line CK The first preset location C is connected to the target point N to obtain a quasi-boundary straight line CN.

In some embodiments, forming, by using a second preset location in the active joystick area mapped in the drawing area, an area boundary line corresponding to each quasi-boundary straight line may include successively obtaining, through the second preset location along a clockwise direction or an anticlockwise direction, the area boundary line corresponding to each quasi-boundary straight line.

For example, successively along the clockwise direction or the anticlockwise direction, an area boundary line L6 corresponding to the quasi-boundary straight line CH is obtained. For example, a parallel line L6 of CH is drawn by using the second preset location and an area boundary line L7 corresponding to the quasi-boundary straight line CK is obtained. For example, a parallel line L7 of CK is drawn by using the second preset location, and an area boundary line L8 corresponding to the quasi-boundary straight line CN is obtained. For example, a parallel line L8 of CN is drawn by using the second preset location.

In some embodiments, forming, by using a second preset location in the active joystick area mapped in the drawing area, an area boundary line corresponding to each quasi-boundary straight line may include determining, as a sequence of obtaining the area boundary line corresponding to each quasi-boundary straight line, a sequence of successively going through each connection line segment along the clockwise direction or the anticlockwise direction. The area boundary line corresponding to each quasi-boundary straight line is successively obtained along the clockwise direction or the anticlockwise direction according to the sequence of obtaining the area boundary line, by using the second preset location as an endpoint of the area boundary line.

For example, if the sequence of successively going through each connection line segment along the clockwise direction is the connection line segment AB, the connection line segment BG, and the connection line segment GA, the sequence of obtaining the area boundary line includes:

First, an area boundary line of the quasi-boundary straight line CH corresponding to the connection line segment AB is obtained. Then, quasi-boundary straight line CK corresponding to the connection line segment BG is obtained. Then, an area boundary line of the quasi-boundary straight line CN corresponding to the connection line segment GA is obtained.

In a process of obtaining the area boundary lines through the second preset location, the area boundary line L6 of the quasi-boundary straight line CH is first obtained. When the area boundary line corresponding to each quasi-boundary straight line is obtained along the clockwise direction, the obtained area boundary line L7 of the quasi-boundary straight line CK is to the right of the area boundary line L6, and the obtained area boundary line L8 of the quasi-boundary straight line CN is to the right of the area boundary line L7. For an example case, the area boundary line L6, the area boundary line L7, and the area boundary line L8 that are obtained are shown in FIG. 9.

One endpoint of the area boundary line L6, the area boundary line L7, and the area boundary line L8 is the second preset location, and the other endpoint is on the area edge of the active joystick area. The area boundary line L6, the area boundary line L7, the area boundary line L8, and the edge of the active joystick area form area boundaries used for distinguishing sub-areas. The active joystick area is divided into three sub-areas, respectively: (i) a sub-area A corresponding to a to-be-applied object located at a location A; (ii) a sub-area B corresponding to a to-be-applied object located at a location B; and (iii) a sub-area G corresponding to a to-be-applied object located at a location G.

An area boundary line corresponding to each quasi-boundary straight line is formed by using a second preset location in the active joystick area located in the drawing area. Forming an area boundary may include successively drawing, in the active joystick area mapped in the drawing area, an area boundary line respectively parallel to each quasi-boundary straight line by using the second preset location as an endpoint of the area boundary line, where the other endpoint of the area boundary line is on an area edge of the active joystick area.

In some embodiments, the area boundary line respectively parallel to each quasi-boundary straight line is successively drawn along the clockwise direction or the anticlockwise direction by using the second preset location as the endpoint of the area boundary line.

In some embodiments, the first preset location and the second preset location are the same location, and certainly, the first preset location and the second preset location may be different locations.

In some embodiments, to remind a user which to-be-applied object is a currently locked on target object, a preset identifier used for representing that the target object is a locked on to-be-applied object may be displayed at a preset location of the target object.

As shown in FIG. 3, when the joystick 12 is located at the location 1 shown in 301, the target object is an object A, and preset identifiers such as five-pointed stars and arrows may be displayed on the top, the bottom, a left side, and a right side of the target object A.

Figure 10:
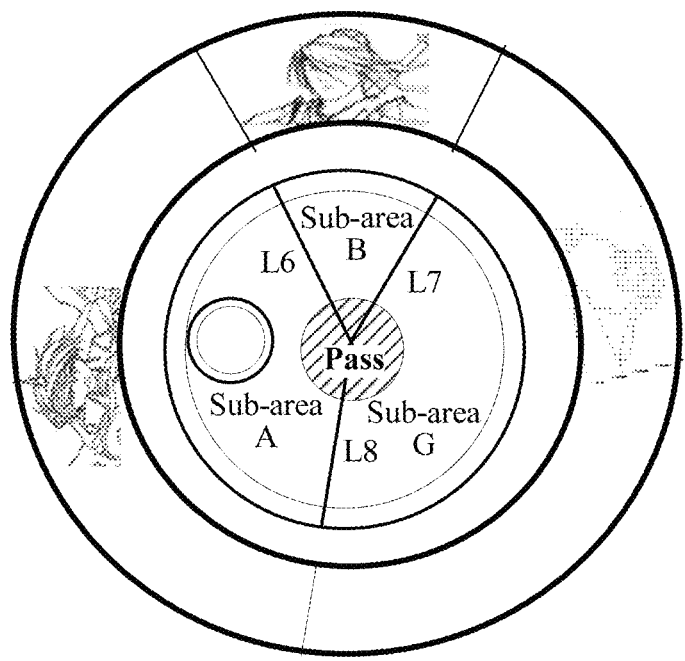
FIG. 10 is a schematic diagram of a correspondence between sub-areas in an active joystick area and the to-be-applied objects in FIG. 9.

Information, such as a profile picture and a name, used for representing each to-be-applied object may be further displayed surrounding the active joystick area. FIG. 10 is a schematic diagram of a correspondence between sub-areas in an active joystick area and the to-be-applied objects in FIG. 9.

The active joystick area shown in FIG. 10 includes: a sub-area A, a sub-area B, and a sub-area G. Information (such as a profile picture) about a to-be-applied object corresponding to each sub-area may float, surrounding the active joystick area, on a side of the corresponding sub-area. When a user positions a joystick, a sub-area corresponding to a to-be-applied object may be quickly determined, so that a target area may be quickly determined in a plurality of sub-area, and the joystick may be positioned to the target area.

An embodiment of this application further provides an apparatus for locking a target object in a game scene corresponding to a method for locking a target object in a game scene. A plurality of modules in the apparatus for locking on to a target object in a game scene that are described in the following may be correspondingly cross-referenced with the steps in the method for locking a target object in a game scene that are described in the foregoing.

Figure 11:
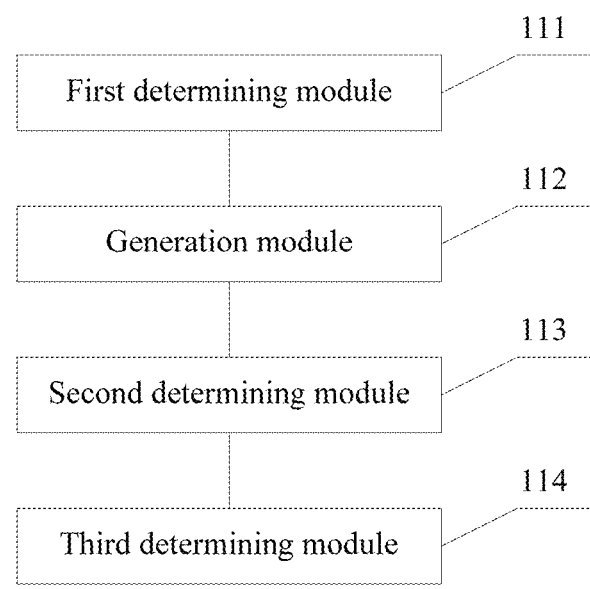
FIG. 11 is a schematic structural diagram of an apparatus for locking a target object in a game scene.

FIG. 11 is a schematic structural diagram of an apparatus for locking a target object in a game scene. The apparatus for locking the target object in the game scene may include a first determining module 111, configured to determine at least one to-be-applied object corresponding to a skill currently triggered by a terminal. The apparatus for locking the target object in the game scene may include a generation module 112, configured to generate, in an active joystick area, a sub-area corresponding to a quantity of the at least one to-be-applied object, one sub-area corresponding to one to-be-applied object. The apparatus for locking the target object in the game scene may include a second determining module 113, configured to determine, in at least one sub-area, a target sub-area indicated by a joystick corresponding to the skill. The apparatus for locking the target object in the game scene may include a third determining module 114, configured to determine, as a target object, a to-be-applied object corresponding to the target sub-area.

In some embodiments, the generation module may include a first determining unit, configured to determine a relative location relationship between the at least one to-be-applied object and a terminal object that represents the terminal. The generation module may a generation unit, configured to generate, in the active joystick area according to the relative location relationship, the sub-area corresponding to the quantity of the at least one to-be-applied object.

In some embodiments, the generation unit may include a mapping subunit, configured to map locations of the terminal object and the at least one to-be-applied object on a map to corresponding locations in a drawing area. The generation unit may include a generation subunit, configured to generate, in the active joystick area according to the corresponding locations of the terminal object and the at least one to-be-applied object in the drawing area, the sub-area corresponding to the quantity of the at least one to-be-applied object.

In some embodiments, the quantity of the at least one to-be-applied object is greater than or equal to 2, and the generation subunit may include a first determining submodule, configured to determine, based on relative locations of the terminal object and each to-be-applied object in the drawing area, an area boundary used for distinguishing each sub-area. The generation subunit may include a generation submodule, configured to generate, in the active joystick area based on each area boundary, the sub-area corresponding to the quantity of to-be-applied objects.

In some embodiments, the first determining submodule may include a first obtaining submodule, configured to successively connect the location of each to-be-applied object in the drawing area, to obtain a plurality of connection line segments, where one location is an endpoint of two connection line segments. The first determining submodule may include a target point determining submodule, configured to respectively determine, in each connection line segment, a target point that is not the endpoint. The first determining submodule may include a first formation submodule, configured to separately connect a first preset location and each target point, to form a quasi-boundary straight line corresponding to a quantity of connection line segments, where the first preset location is a location of the terminal object in the drawing area. The first determining submodule may include a second formation submodule, configured to form, by using a second preset location in the active joystick area mapped in the drawing area, an area boundary line corresponding to each quasi-boundary straight line, to form an area boundary.

In some embodiments, the second formation submodule may include a second obtaining submodule, configured to successively draw, in the active joystick area mapped in the drawing area, an area boundary line respectively parallel to each quasi-boundary straight line by using the second preset location as an endpoint of the area boundary line, where the other endpoint of the area boundary line is on an area edge of the active joystick area.

In some embodiments, the second obtaining submodule is specifically configured to: in the active joystick area mapped in the drawing area, successively draw, along a clockwise direction or an anticlockwise direction, the area boundary line respectively parallel to each quasi-boundary straight line by using the second preset location as the endpoint of the area boundary line.

In some embodiments, a target point is a middle point of a corresponding connection line segment, and/or the second preset location is a circle center of the active joystick area.

In some embodiments, the first determining module may include a first obtaining unit, configured to obtain an application range corresponding to the skill. The first determining module may include a second determining unit, configured to determine the at least one to-be-applied object according to the application range.

In some embodiments, the second determining unit is configured to determine, as the to-be-applied object, an object that is in the application range and to which the skill may be applied. In some embodiments, the application range includes the terminal object and at least two objects, and the second determining unit may include a formation subunit, configured to separately connect a location of the terminal object and locations of the objects located in the application range, to form a connection straight line. The second determining unit may include a determining subunit, configured to determine, as the to-be-applied object, an object that is on the connection straight line and that is closest to the location of the terminal object.

In some embodiments, the apparatus further includes: a display module, configured to display, at a preset location of the target object, a preset identifier used for representing that the target object is a locked to-be-applied object.

In various ones of the example embodiments discussed above the modules and submodules may correspond to circuitry and sub-circuitry, respectively. In various ones of the example embodiments discussed above the units and subunits may correspond to circuits and sub-circuits, respectively. In various ones of the example embodiments the circuitry, sub-circuitry, circuits, and sub-circuits may include hardware. The hardware of the circuitry, sub-circuitry, circuits, and sub-circuits may be configured to execute instructions consistent with the methods, techniques and architectures discussed herein.

An embodiment of this application further provides an electronic device. A structural diagram of the electronic device is shown in FIG. 2. In addition to a display 21, a memory 22, and a processor 23 shown in FIG. 2, the electronic device may further include: a communications interface and a communications bus. The display 21, the processor 23, the communications interface, and the memory 22 communicate with each other by using the communications bus.

In some embodiments, the communication interface may be an interface of a communications module, for example, an interface of a GSM module.

The processor 23 may be a central processing unit (CPU) or an application-specific integrated circuit (ASIC), or may be one or more integrated circuits configured to implement the embodiments of this application.

The memory 22 may include a high-speed RAM memory, and may further include a non-volatile memory, for example, at least one magnetic disk memory.

The processor 23 may execute a program stored in the memory 22, and the program may be specifically configured to determine at least one to-be-applied object corresponding to a skill currently triggered by a terminal. The program may be configured to generate, in an active joystick area, a sub-area corresponding to a quantity of the at least one to-be-applied object, one sub-area corresponding to one to-be-applied object. The program may be configured to determine, in at least one sub-area, a target sub-area indicated by a joystick corresponding to the skill. The program may be configured to determine, as a target object, a to-be-applied object corresponding to the target sub-area.

The relational terms herein such as first and second are used to differentiate an entity or operation from another entity or operation, and do not require or imply any actual relationship or sequence between these entities or operations. Moreover, the term "include", "include", or any variant thereof is intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device.

The embodiments in this specification are all described in a progressive manner. Descriptions of each embodiment focus on differences from other embodiments, and same or similar parts among the embodiments may be mutually referenced.

The above descriptions of the disclosed embodiments make a person skilled in the art implement or use this application. Various modifications to these embodiments are obvious to a person skilled in the art, and the general principles defined in this specification may be implemented in other embodiments.

What is claimed is:

1. A method for locking on to a target object in a game scene using a terminal, the method comprising:
    displaying the game scene in a game scene area on a display of the terminal;
    determining at least one to-be-applied object corresponding to a skill currently triggered by the terminal, wherein the quantity of the at least one to-be-applied object is greater than or equal to 2;
    generating, in an active joystick area, a sub-area corresponding to a quantity of the at least one to-be-applied object, one sub-area corresponding to one to-be-applied object, by:
        mapping locations of a terminal object and the at least one to-be-applied object on a map to corresponding locations in a drawing area; and
        generating, in the active joystick area according to the corresponding locations of the terminal object and the at least one to-be-applied object in the drawing area, the sub-area corresponding to the quantity of the at least one to-be-applied object by:
            determining, based on relative locations of the terminal object and each to-be-applied object in the drawing area, an area boundary used for distinguishing each sub-area;
            generating, in the active joystick area based on each area boundary, the sub-area corresponding to the quantity of to-be-applied objects; and
            displaying each area boundary within the active joystick area on the display;
    displaying the active joystick area separated from the game scene area on the display of the terminal;
    determining, in at least one sub-area, a target sub-area indicated by a joystick corresponding to the skill; and
    determining, as a target object, a to-be-applied object corresponding to the target sub-area.

2. The method according to claim 1, wherein the generating, in the active joystick area, the sub-area corresponding to the quantity of the at least one to-be-applied object comprises:
    determining a relative location relationship between the at least one to-be-applied object and the terminal object that represents the terminal; and
    generating, in the active joystick area according to the relative location relationship, the sub-area corresponding to the quantity of the at least one to-be-applied object.

3. The method according to claim 2, wherein the determining, based on relative locations of the terminal object and each to-be-applied object in the drawing area, an area boundary used for distinguishing each sub-area comprises:
    successively connecting the location of each to-be-applied object in the drawing area, to obtain a plurality of connection line segments, wherein one location is an endpoint of two connection line segments;
    respectively determining, in each connection line segment, a target point that is not the endpoint;
    separately connecting a first preset location and each target point, to form a quasi-boundary straight line corresponding to a quantity of connection line segments, wherein the first preset location is a location of the terminal object in the drawing area; and
    forming, by using a second preset location in the active joystick area mapped in the drawing area, an area boundary line corresponding to each quasi-boundary straight line, to form an area boundary.

4. The method according to claim 3, wherein the forming, by using a second preset location in the active joystick area mapped in the drawing area, an area boundary line corresponding to each quasi-boundary straight line comprises:

successively drawing, in the active joystick area mapped in the drawing area, an area boundary line respectively parallel to each quasi-boundary straight line by using the second preset location as an endpoint of the area boundary line, wherein the other endpoint of the area boundary line is on an area edge of the active joystick area.

5. The method according to claim 4, wherein the successively drawing an area boundary line respectively parallel to each quasi-boundary straight line by using the second preset location as an endpoint of the area boundary line comprises:

successively drawing, along a clockwise direction or an anticlockwise direction, the area boundary line respectively parallel to each quasi-boundary straight line by using the second preset location as the endpoint of the area boundary line.

6. The method according to claim 3, wherein a target point is a middle point of a corresponding connection line segment, and/or the second preset location is a circle center of the active joystick area.

7. The method according to claim 1, wherein the determining at least one to-be-applied object corresponding to a skill currently triggered by the terminal comprises:

obtaining an application range corresponding to the skill; and determining the at least one to-be-applied object according to the application range.

8. The method according to claim 7, wherein the determining the at least one to-be-applied object according to the application range comprises:

determining, as the to-be-applied object, an object that is in the application range and to which the skill may be applied.

9. The method according to claim 7, wherein the application range comprises the terminal object and at least two objects, and the determining the at least one to-be-applied object according to the application range comprises:

separately connecting a location of the terminal object and locations of the objects located in the application range, to form a connection straight line; and determining, as the to-be-applied object, an object that is on the connection straight line and that is closest to the location of the terminal object.

10. The method according to claim 1, further comprising:

displaying, at a preset location of the target object, a preset identifier used for representing that the target object is a locked on to-be-applied object.

11. An apparatus for locking on a target object in a game scene, the apparatus comprising:

displaying the game scene in a game scene area on a display of a terminal;

first determining circuitry, configured to determine at least one to-be-applied object corresponding to a skill currently triggered by the terminal, wherein the quantity of the at least one to-be-applied object is greater than or equal to 2;

generation circuitry, configured to generate, in an active joystick area, a sub-area corresponding to a quantity of the at least one to-be-applied object by:

mapping locations of a terminal object and the at least one to-be-applied object on a map to corresponding locations in a drawing area; and generating, in the active joystick area according to the corresponding locations of the terminal object and the at least one to-be-applied object in the drawing area, the sub-area corresponding to the quantity of the at least one to-be-applied object by:

determining, based on relative locations of the terminal object and each to-be-applied object in the drawing area, an area boundary used for distinguishing each sub-area;

generating, in the active joystick area based on each area boundary, the sub-area corresponding to the quantity of to-be-applied objects; and displaying each area boundary within the active joystick area on the display, one sub-area corresponding to one to-be-applied object;

second determining circuitry, configured to determine, in at least one sub-area, a target sub-area indicated by a joystick corresponding to the skill;

third determining circuitry, configured to determine, as a target object, a to-be-applied object corresponding to the target sub-area; and display circuitry configured to:

display the game scene in a game scene area on a display of the terminal; and the active joystick area separated from the game scene area on the display of the terminal.

12. The apparatus according to claim 11, wherein the generation circuitry comprises:

a first determining circuit, configured to determine a relative location relationship between the at least one to-be-applied object and the terminal object that represents the terminal; and a generation circuit, configured to generate, in the active joystick area according to the relative location relationship, the sub-area corresponding to the quantity of the at least one to-be-applied object.

13. An electronic device, comprising:

a memory, configured to store a program; and a processor, configured to execute the program, the program being specifically configured to perform:

displaying a game scene in a game scene area on a display of a terminal;

determining at least one to-be-applied object in the game scene corresponding to a skill currently triggered by the terminal, wherein the quantity of the at least one to-be-applied object is greater than or equal to 2;

generating, in an active joystick area, a sub-area corresponding to a quantity of the at least one to-be-applied object, one sub-area corresponding to one to-be-applied object, by:

mapping locations of a terminal object and the at least one to-be-applied object on a map to corresponding locations in a drawing area; and generating, in the active joystick area according to the corresponding locations of the terminal object and the at least one to-be-applied object in the drawing area, the sub-area corresponding to the quantity of the at least one to-be-applied object by:

determining, based on relative locations of the terminal object and each to-be-applied object in the drawing area, an area boundary used for distinguishing each sub-area;

generating, in the active joystick area based on each area boundary, the sub-area corresponding to the quantity of to-be-applied objects; and displaying each area boundary within the active joystick area on the display;

displaying the active joystick area separated from the game scene area on the display of the terminal;

determining, in at least one sub-area, a target sub-area indicated by a joystick corresponding to the skill; and determining, as a target object, a to-be-applied object corresponding to the target sub-area.

14. The electronic device according to claim 13, wherein the program is configured to perform generating, in the active joystick area, the sub-area corresponding to the quantity of the at least one to-be-applied object by:

determining a relative location relationship between the at least one to-be-applied object and the terminal object that represents the terminal; and generating, in the active joystick area according to the relative location relationship, the sub-area corresponding to the quantity of the at least one to-be-applied object.

15. The electronic device according to claim 14, wherein the program is configured to perform determining, based on relative locations of the terminal object and each to-be-applied object in the drawing area, an area boundary used for distinguishing each sub-area by:

successively connecting the location of each to-be-applied object in the drawing area, to obtain a plurality of connection line segments, wherein one location is an endpoint of two connection line segments;

respectively determining, in each connection line segment, a target point that is not the endpoint;

separately connecting a first preset location and each target point, to form a quasi-boundary straight line corresponding to a quantity of connection line segments, wherein the first preset location is a location of the terminal object in the drawing area; and forming, by using a second preset location in the active joystick area mapped in the drawing area, an area boundary line corresponding to each quasi-boundary straight line, to form an area boundary.

16. The electronic device according to claim 15, wherein the program is configured to perform forming, by using a second preset location in the active joystick area mapped in the drawing area, an area boundary line corresponding to each quasi-boundary straight line by:

successively drawing, in the active joystick area mapped in the drawing area, an area boundary line respectively parallel to each quasi-boundary straight line by using the second preset location as an endpoint of the area boundary line, wherein the other endpoint of the area boundary line is on an area edge of the active joystick area.

17. The electronic device according to claim 13, wherein the determining at least one to-be-applied object corresponding to a skill currently triggered by the terminal comprises:

obtaining an application range corresponding to the skill; and determining the at least one to-be-applied object according to the application range.

18. The electronic device according to claim 17, wherein the determining the at least one to-be-applied object according to the application range comprises:

determining, as the to-be-applied object, an object that is in the application range and to which the skill may be applied.

19. The electronic device according to claim 17, wherein the application range comprises the terminal object and at least two objects, and the determining the at least one to-be-applied object according to the application range comprises:

separately connecting a location of the terminal object and locations of the objects located in the application range, to form a connection straight line; and determining, as the to-be-applied object, an object that is on the connection straight line and that is closest to the location of the terminal object.

* * * * *